(12) United States Patent
Abood (10) Patent No.: US 11,857,019 B1
(45) Date of Patent: Jan. 2, 2024

(54) HEADGEAR HYPERTHERMIA LINER

(71) Applicant: Equalizer Technology, LLC, Rocky River, OH (US)

(72) Inventor: David G. Abood, Rocky River, OH (US)

(*) Notice: Subject to any disclaimer, the term of this patent is extended or adjusted under 35 U.S.C. 154(b) by 612 days.

(21) Appl. No.: 16/242,295

(22) Filed: Jan. 8, 2019

Related U.S. Application Data (63) Continuation-in-part of application No. 13/692,060, filed on Dec. 3, 2012, now Pat. No. 11,545,052, which is a continuation-in-part of application No. 12/649,887, filed on Dec. 30, 2009, now Pat. No. 10,219,568, application No. 16/242,295, filed on Jan. 8, 2019 is a continuation-in-part of application No. 14/850,940, filed on Sep. 10, 2015, now abandoned, and a continuation-in-part of application No. 15/872,095, filed on Jan. 16, 2018, now Pat. No. 11,528,950, which is a continuation-in-part of application No. 14/850,940, filed on Sep. 10, 2015, now abandoned, which is a continuation-in-part of application No. 13/692,060, filed on Dec. 3, 2012, now Pat. No. 11,545,052.

(60) Provisional application No. 62/617,705, filed on Jan. 16, 2018, provisional application No. 62/048,684, filed on Sep. 10, 2014.

(51) Int. Cl.
 *A42B 3/10* (2006.01)
 *A42B 3/04* (2006.01)

(52) U.S. Cl.
 CPC .............. *A42B 3/10* (2013.01); *A42B 3/0406* (2013.01)

(58) Field of Classification Search
 CPC ................................. A43B 3/10; A42B 3/0406
 See application file for complete search history.

(56) References Cited

U.S. PATENT DOCUMENTS

| | | | | |
|---|---|---|---|---|
| 4,552,149 A | * | 11/1985 | Tatsuki | A61F 7/10 607/110 |
| 5,146,630 A | * | 9/1992 | Richard | A41D 20/005 2/171.2 |
| 5,197,292 A | * | 3/1993 | McPherson | A42B 1/008 62/530 |
| 5,327,585 A | * | 7/1994 | Karlan | A42C 5/04 2/209.13 |
| 5,365,607 A | * | 11/1994 | Benevento, Jr. | A42B 1/008 2/171.1 |
| 5,557,807 A | * | 9/1996 | Hujar | A42B 1/0187 2/209.13 |

(Continued)

*Primary Examiner* — Richale L Quinn
(74) *Attorney, Agent, or Firm* — Gugliotta & Gugliotta, LPA (57) ABSTRACT

A hyperthermia headgear liner is provided comprised of an insulative material constructed to minimize exposures to fibrous materials an remove any habitat for bacterial growth. The cap extends over a greater portion of a wearer's forehead, over the wearer's ears and behind the head to reach as far as the top of the cervical spine. Lining the upper portion of the inner shell are a plurality of linearly aligned pockets formed of an open weave of mesh fabric. Each individual pocket contains and secures a cooling element formed of a phase change material. The cooling elements are removable and replaceable and are positioned along the midline of the head covering in a manner that form fittingly curves with the contour of the wearers head.

12 Claims, 5 Drawing Sheets

(56) References Cited

U.S. PATENT DOCUMENTS

| | | | | |
|---|---|---|---|---|
| 5,605,144 | A * | 2/1997 | Simmons | A42B 3/10 2/171.2 |
| 5,630,230 | A * | 5/1997 | Fujino | A42B 3/10 2/200.1 |
| 6,237,154 | B1 * | 5/2001 | Reuven | A42B 1/008 2/171.2 |
| 6,397,399 | B1 * | 6/2002 | Lampe | A63B 71/10 2/171.2 |
| 6,557,179 | B1 * | 5/2003 | Reuven | A42B 1/008 2/209 |
| 6,817,039 | B1 * | 11/2004 | Grilliot | A42B 3/14 2/416 |
| 7,028,344 | B2 * | 4/2006 | Toth | A42B 3/122 2/171.2 |
| 7,043,761 | B2 * | 5/2006 | Epling | A42C 5/04 2/200.1 |
| 8,262,601 | B2 * | 9/2012 | Cumming | A61F 13/12 602/14 |
| 8,613,114 | B1 * | 12/2013 | Olivares Velasco | A41D 31/065 2/171.1 |
| 9,907,346 | B2 * | 3/2018 | Hanson | A42B 3/069 |
| 10,021,926 | B2 * | 7/2018 | Stevenson | A41D 20/005 |
| 10,080,394 | B2 * | 9/2018 | Johnston | A42B 3/00 |
| 10,219,568 | B1 * | 3/2019 | Saluan | A42B 1/012 |
| 10,383,386 | B2 * | 8/2019 | Abraham | B32B 25/20 |
| 10,624,403 | B2 * | 4/2020 | Seela | A42B 1/24 |
| 11,266,193 | B2 * | 3/2022 | Bowman | A42B 1/008 |
| 2002/0002730 | A1 * | 1/2002 | Dennis | A42B 3/127 2/414 |
| 2002/0100106 | A1 * | 8/2002 | Simmons | A42C 5/04 2/171.2 |
| 2003/0200598 | A1 * | 10/2003 | Jessie | A42B 3/122 2/413 |
| 2003/0221241 | A1 * | 12/2003 | Rivera | A41D 20/005 2/170 |
| 2004/0226077 | A1 * | 11/2004 | Toth | A42B 3/127 2/422 |
| 2005/0060911 | A1 * | 3/2005 | Falone | A43B 17/003 36/44 |
| 2010/0037366 | A1 * | 2/2010 | Panicali | A42B 1/008 2/209.13 |
| 2011/0094012 | A1 * | 4/2011 | Toth | A42B 3/121 62/530 |
| 2014/0173806 | A1 * | 6/2014 | Fournier | A41D 20/00 2/170 |
| 2016/0021962 | A1 * | 1/2016 | Lacy | A42B 1/22 2/181 |
| 2016/0058084 | A1 * | 3/2016 | Stevenson | A41D 20/005 2/209.13 |
| 2017/0127744 | A1 * | 5/2017 | Haggard | A42B 1/0189 |
| 2018/0303182 | A1 * | 10/2018 | Smith | A42C 5/04 |

* cited by examiner

HEADGEAR HYPERTHERMIA LINER

RELATED APPLICATIONS

The present application claims benefit of U.S. Provisional Ser. No. 62/617,705, filed on Jan. 16, 2018, and is also a Continuation in Part of U.S. Ser. No. 12/649,887 filed on Dec. 30, 2009, both which are incorporated by reference herein as if fully rewritten.

BACKGROUND OF THE INVENTION

1. Field of the Invention

The present invention relates generally to industrial military, sports, consumer and other safety headgear and, more specifically, to the inclusion of systems, devices and methods for maintaining a wearers body temperature in the event overheating or hyperthermia during use.

2. Description of the Related Art

Hyperthennia is an elevated body temperature due to failed thermoregulation. Hyperthermia occurs when the body produces or absorbs more heat than it can dissipate, When the elevated body temperatures are sufficiently high, hyperthermia is a medical emergency and requires immediate treatment to prevent disability or death.

Heat stroke is an acute condition of hyperthermia that is caused by prolonged exposure to excessive heat or heat and humidity. The heat-regulating mechanisms of the body eventually become overwhelmed and unable to effectively deal with the heat, causing the body temperature to climb uncontrollably. Hyperthermia differs from fever in the mechanism that causes the elevated body temperatures In that a fever Is caused by a change In the body temperature set-point.

Heat stroke in particular is the most prevalent cause of hyperthermia and is due to an environmental exposure to heal, resulting in an abnormally high body temperature, heat stroke may be non-exertional (classic) or exertional, depending on whether the person has been exercising in the heat. Significant physical exertion an a very hot day can generate heat beyond a healthy body's ability to cool itself, because the heat and humidity of the environment reduce the efficiency of the body's normal cooling mechanisms. This is particularly a problem in dealing with organized sports training. For example, in the United States, college and high school football is a fail seasonal sport in which training begins in during the peak of summer. Conditions such as heat, humidity, exercise, and uniforms and equipment that can lead to an insulating effect that can all contribute to a greater incidence of the condition.

Conventionally recognized treatments for hyperthermia depend upon the cause, as the underlying cause must be corrected. Mid hyperthermia caused by exertion on a hot day might be adequately treated through self-care measures, such as drinking water and resting in a cool place. However, when the body temperature is significantly elevated, mechanical methods of cooling are used to remove heat from the body and to restore the body ability to regulate its own temperatures.

Passive cooling techniques, such as resting in a cool, shady area and removing clothing can be applied immediately. Active cooling methods, such as sponging the head, neck, and trunk with cool water, remove heat from the body and thereby speed the body's return to normal temperatures. Drinking water and turning a fan or dehumidifying air conditioning unit on the affected person may improve the effectiveness of the body's evaporative cooling mechanism (sweating).

In many industrial work settings, workers can be exposed to noxious environmental conditions. Hot, humidity and stagnant air in indoor factory settings can put stress on a worker's body for a prolonged work shift. Heat, humidity and sun exposure for outdoor utility workers, construction workers, or the like can pose a similar stress. Similar conditions in conjunction with extreme physical activity can create acute conditions for amateur and professional athlete as well. Further, in all of these situations, the person exposed to adverse conditions that pose an expedited threat of hyperthermia is further burdened with particular safety equipment that can exacerbate the conditions: safety helmets, uniforms, fire retardant clothing, etc.

One particular method of heat stress protection that is currently in use is the placement of passive coding devices, known as hat liners, within the various work helmets. One example of such a system is the PhaseCore™ Cooling Hat Liner provided by FirstLine Technology LLC of Chantilly, VA. Such PhaseCore™ hat liners are accessories that reduce and combat heat stress. Using a phase change material (PCM) the PhaseCore™ hat liners attach with hook and loop fasteners into hats or helmets to provide a cooling effect by absorbing heat from the head and keeping the wearer comfortable. However, because the accouterments of each activity or profession can vary in size, shape, material, etc., such hat liners are generally not well adapted for use with many or most of the various types of industrial, military, consumer of sports specific safety headgear, and especially cannot be used between differing activities.

Consequently, a need exists for a passive cooling headgear accessory that can aid in regulating a wearer's body temperature In the event overheating or hyperthermia during use, while also allowing for increase comfort and adaptability of use with various types of safety headgear.

SUMMARY OF THE INVENTION

It is an object of the present Invention to provide a passive cooling head covering for the mitigation of hyperthermia to those industrial workers, military personnel, athletic participants or general consumer user who are additionally burdened with activity related safety gear that may include task specific adapted headgear.

It is a further object of the present invention to provide a system for maintaining a wearers body temperature in the event overheating or hyperthermia during use.

It is an object of the present Invention: to reduce the risks of workers and activity participants who are further required to don activity specific safety gear that would otherwise limit natural body cooling from developing hyperthermia related accidents or conditions.

It is another object of the present invention to provide such a system, device and method that allows for increase comfort and adaptability of use with various types of safety headgear in a manner that is easy to use, while still meeting strict safety compliance standards of those markets served.

Briefly described according to a preferred embodiment, a hyperthermia headgear liner Is provided comprised of an insulative material that is both stretchable and flexible to provide a means forth e cap to follow the contour eta head. The insulative material is constructed to minimize exposures to fibrous materials and, as such, to remove any habitat for bacterial growth. An insulative inner portion and a shell is fabricated from the materials including a ceramic fiber material that contain e plurality of micro encapsulated and paraffinic hydrocarbons and a synthetic micro fiber having a composition approximating 65% olefin and 35% polyester, and is generally fire retardant. The cap extends over a greater portion of a wearer's forehead, over the wearer's ears and behind the head to reach as far as the top of the cervical spine. Lining the upper portion of the inner shell are a plurality of linearly aligned pockets formed of an open weave of mesh fabric. Each individual pocket contains and secures a cooling element formed of a phase change material. The cooling elements are removable and replaceable and, when installed, are positioned comfortably along the midline of the head covering in a manner that form fittingly curves with the contour of the wearers head.

An object of the present hyperthermia cap to allow the coding elements to be both comfortably positioned along user's head while allowing them to conform within the various contours and recesses of various type of hard shell safety headgear.

A further advantage of the present invention is to allow for passive cooling of a users head in a manner that comfortably fits with, and does not interfere with the normal operation of, various types of activity specific hard shell safety headgear.

It is additional advantages of the present invention to provide all of the advantages that the foregoing objects entail.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 8 is a side elevational view thereof shown donned on the head of a wearer.

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to FIG. 1-5, a covering unit, generally noted as 10, is shown for covering the head of an industrial worker or sports participant. The covering unit 10 covers a substantial portion of the head 70, as will be described in greater detail below and forms a multi-part shell component having an inner surface 12 adapted for closely fitting the contours of a users head so as to prevent open air space between the head and an inner surface. The shell component further has an outer surface 14, and forming an opening 16 circumscribed by a gripping lower edge 18. This gripping lower edge 18 forms a gripping mans for gripping to a wearers head in a manner such as to impede said the head covering unit from coming off of the wearer's head during use.

The covering unit 10 is intended to be used in conjunction with an otherwise conventional hard shell safety helmets, of which is shown a construction safety helmet 13. it should be apparent to a person having ordinary skill in the relevant art, in light of the present teachings, that its use in conjunction with a construction type safety helmet 13 is exemplary only and not limiting, and the use in conjunction with any other type of specialized, hard shell safety head gear, whether industrial, military or athletic, should be considered as an equivalent. By way of example, and not meant as a limitation, any type of a multitude of athletic helmets, including football helmets, batting helmets, cricket helmets, bicycle helmets, motorcycle helmets and racing helmets can all be utilized in conjunction: with the present invention.

Figure 1:
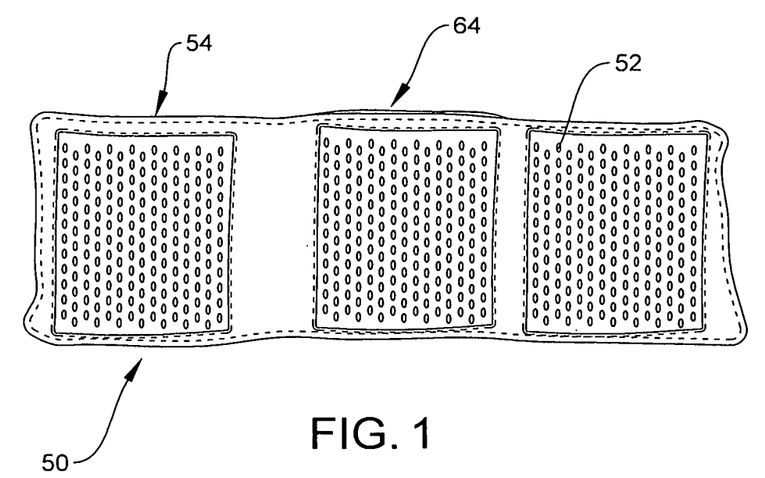
FIG. 1 is a top plan view of a headgear hyperthermia element liner cap according to a preferred embodiment of the present invention.
Figure 2:
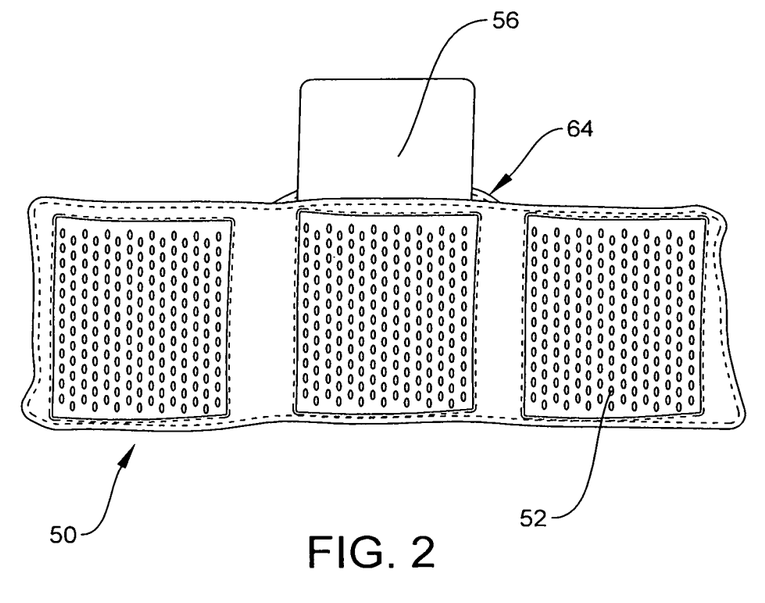
FIG. 2 is a detailed top plan view thereof shown with a cooling element partially removed.
Figure 3:
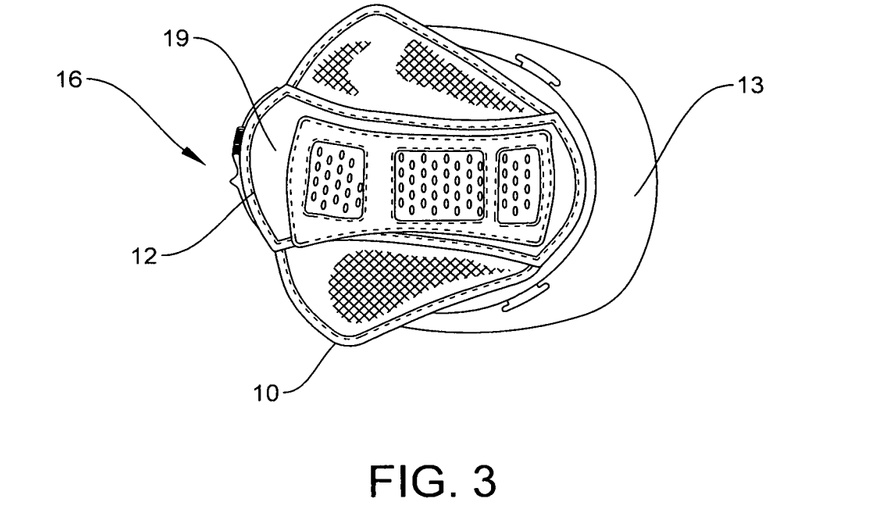
FIG. 3 is a bottom plan view thereof shown in conjunction with a hyperthermia cap and inserted into an otherwise conventional construction safety helmet.
Figure 4:
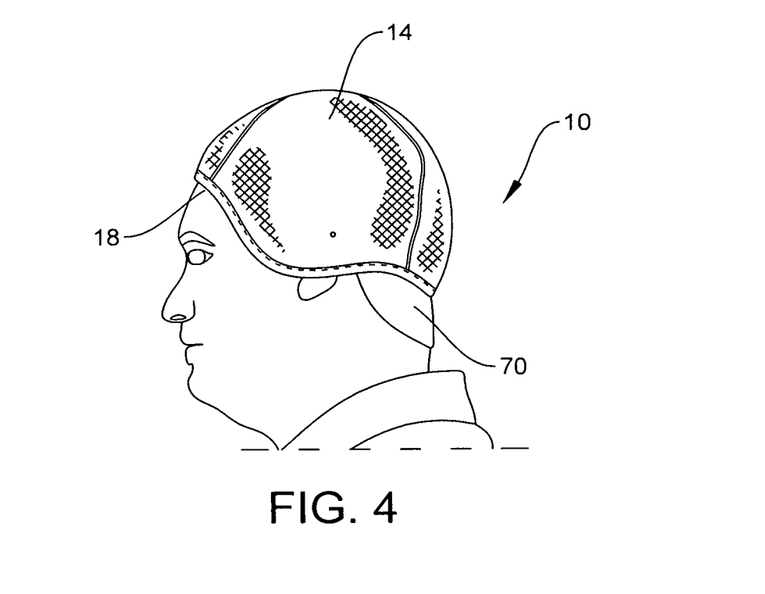
FIG. 4 is a side elevational view thereof shown donned on the head of a wearer.
Figure 5:
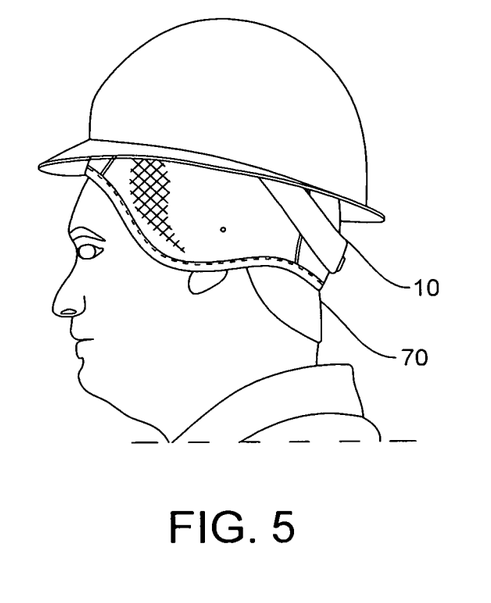
FIG. 5 is a side elevational view thereof shown donned on the head of a wearer and positioned with an otherwise conventional construction safety helmet.
Figure 6:
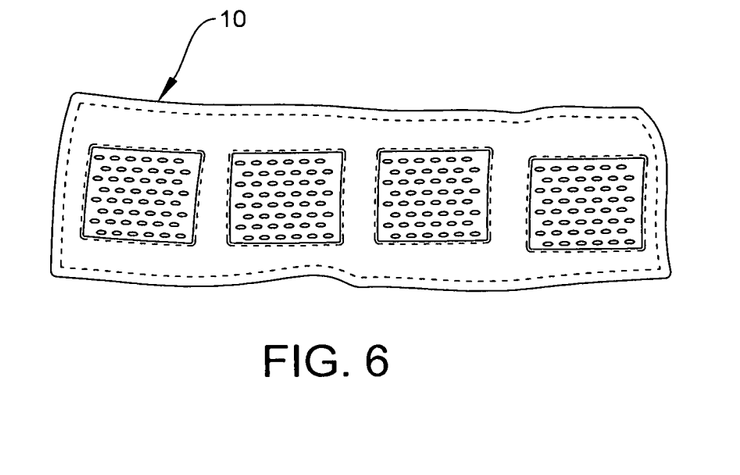
Figure 7:
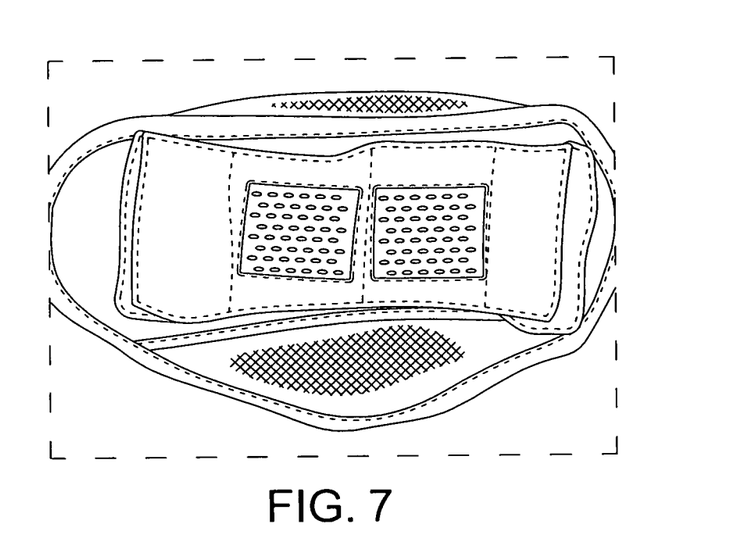
FIG. 7 is a bottom plan view thereof shown inserted into an otherwise conventional construction safety helmet.
Figure 8:
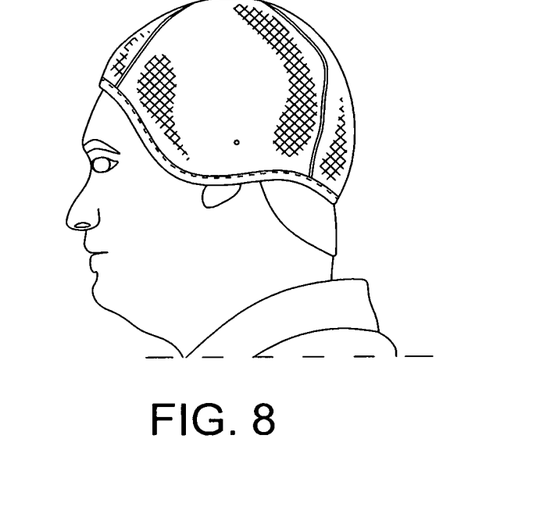
FIG. 8 is a top plan view of a headgear hyperthermia liner cap according to a first alternate embodiment of the present invention.
Figure 9:
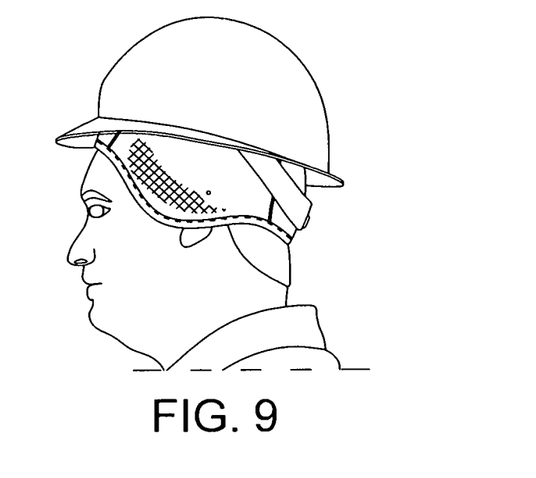
FIG. 9 is a side elevational view thereof shown donned on the head of a wearer and positioned underneath an otherwise conventional construction safety helmet.

The shell component 14 preferably will provide insulating properties, and may include an insulating filling. However, in greater detail as shown in FIG. 1-2, the material of the shell component is anticipated as being thicker than 1 mm and less than 2 mm thick and adapted for positioning over both lateral side portions of the head. The hyperthermia element 50 is formed of a rectilinear pocket element formed of an open weave or mesh fabric 52. The element 50 can be either permanently affixed within the inner surface 12 of the cap 10, or removably affixed thereto with connectors, such as, for example, hook and loop fasteners. A plurality of pockets 54 formed therein are adapted for receiving passive cooling elements. Each passive cooling element 58 is anticipated as including a phase change material (PCM). Various types of PCM are known and available, having various phase change temperatures and activation temperatures. While the particular type of PCM or specific activation temperature is not intended as being limiting of the present invention, for purposes of disclosure it is felt that having an activation temperature of between 28° F. through 58° F. would be preferred in light of the intended uses, objects and advantages provided herein.

As shown in the preferred embodiment in FIG. 1 through FIGS. 5, the use of three (3) individual pockets are formed for replaceably containing three (3) separate PCM elements is provided. Each pocket 60 may be provided with an individual closure element such as flap closure with a fastener, or the equivalent. As additionally and shown best in conjunction with FIG. 6-9, an additional pocket 60, for a total of four (4) individual pockets 60 containing four (4) separate PCM elements may be used as well.

Also illustrated in either the primary embodiment of FIG. 1-5, or the alternate embodiment of FIG. 6-9. the covering unit 10 will preferably cover below the mid point of the external auditory meatus bilaterally in addition to the roar portion of the head and upper neck region. The material covering the head has been designed to be in contact with the head in all covered areas so as to prevent a significant amount of air space between the head and the inner material covering the head. To accomplish this the shell component is made from a pattern cut that is asymmetric from a section of the covering unit adapted for covering the front of the head and a section of the covering unit adapted for covering the rear of the head covering unit, such that the pattern cut has a concave pattern so as to emulate the shape of the front and rear of the head to prohibit the head covering unit from coming off of the head during surgery.

It is preferred that the shell component comprise insulative properties. There is anticipated that the material of the shell component, as shown best in conjunction with FIG. 3 and FIG. 7, approximates a thickness no less than 1 mm and preferably between 1-mm and 2-mm or greater. The shell's thickness is not limited to the approximations disclosed herein, but may alternatively comprise any thickness that both maintains euthermic range and adapts to a potion over both lateral portions of the user's head.

Additionally anticipated that an additional insulative component 19 lines a portion of the inner surface 12. The insulative component 19 comprises material having a thickness greater than 2-mm at the areas adapted to cover the posterior, the anterior and the top portions of the head The insulative component 19 comprises material having a thickness less than 2-mm at the areas adapted to cover both of the lateral portions.

The covering unit 10 insulates a greater portion of the user's head along approximately the central third, the anterior and the posterior portions. As also illustrated throughout the Figures, the covering unit 10 preferably covers below the midpoint of the external auditory meatus bilaterally in addition to the rear portion of the head and the upper neck region. The inner material that covers the head is designed to be in direct contact with the head to prevent the adverse effects of having air gaps has on a users hyperthermia. The direct contact is accomplished by means of a shell component made from a pattern cut asymmetrically from a section of the covering unit adapted to cover the front of the head and from a section of the covering unit adapted to cover the rear of the head. The pattern cut is concave to emulate the shape of the front and the rear of a head; it prohibits the covering unit 10 from falling off during use. The pattern forms a gap less than ¾ inch, preferably less than ½ inch and most preferably less than ¼ inch.

It is additionally contemplated that the covering unit 10 include material that comprises a temperature regulating micro fiber. The enclosed cap may further incorporate a chin strap attached to the lower right and the lower left aspects of the covering unit 10.

It is envisioned that the covering unit 10 is manufactured in various sizes, e.g., the standard sizes that include extra-small, small, medium, large, extra-large and the like For a more efficient fit, the covering unit 10 may comprise the various standard sizes for different age ranges. Additionally, an adjustment or a take-up mechanism may be used to ensure a closed cover. The users head without pressing on the users head. The covering unit 10 laterally grips below the users external auditory meatus. Finally, it is envisioned that the material used in the, head covering unit does not emit sparks nor is it static conductive. In that its intended use may be in conjunction with other fire retardant safety equipment. It may also be made of a fire retardant material.

2. Operation of the Preferred Embodiment

In operation, the present invention the covering unit 10 is anticipated for use in maintaining the heed temperature and care body temperature within euthermic range for a user in conjunction with other athletic or work related safety equipment, and especially in conjunction with hard shell safety headgear. Anticipated as being used in an operationally nonconflicting manner in conjunction with a construction safety helmets, fireman's safety helmets, as well as athletic helmets such as for use with football, biking, skateboarding and the like, the user's head 70 is covered at the forehead, ears and a base having a back portion along a line where the head and neck meet. The covering unit 10 is closely fitted to the head and maintains a close proximity while on the wearer water. The head covering 10 provides further additional insulation at least a portion of a users head while being donned. The covering unit 10 is made such as to grippingly engage below the wearers external auditory meatus bilaterally and conform closely to the users head.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A hyperthermia headgear liner consisting essentially of:
   an inner shell having an inner surface and formed of a flexible stretch material that is configured to closely fit a contour of a user's head from a front terminus to a rear upper neck region and preventing open air space between said head and said inner surface;
   said inner shell formed of a material being stretchable, flexible and antibacterial;
   a lining affixed to only a portion of the inner surface along a top of the inner shell about a vertical centerline of the headgear liner, said lining including a plurality of linearly aligned pockets formed of an open weave or mesh fabric;
   an insulative component formed within the inner shell concomitant with the vertical centerline; and
   a cooling element formed of a phase change material removably retained within in pocket;
   wherein said plurality of linearly aligned pockets are positioned along the midline of the headgear liner.

2. The hyperthermia headgear liner of claim 1, wherein said inner shell is further installed into a hard shell safety headwear.

3. The hyperthermia headgear liner of claim 2, wherein said hard shell head wear is selected from a group consisting of: industrial safety helmets; hard hats; football helmets, batting helmets, cricket helmets, bicycle helmets, motorcycle helmets and racing helmets.

4. The hyperthermia headgear liner of claim 1, wherein said insulative component has a thickness greater than 2 mm and the inner shell has a thickness of about 1 mm.

5. The hyperthermia headgear liner of claim 1, wherein said phase change material has an activation temperature of between 28° F. through 58° F.

6. The hyperthermia headgear liner of claim 2, wherein said wherein said insulative component has a thickness greater than 2 mm and the inner shell has a thickness no greater than about 1 mm.

7. The hyperthermia headgear liner of claim 3, wherein said insulative component has a thickness greater than 2 mm and the inner shell has a thickness no greater than about 1 mm.

8. The hyperthermia headgear liner of claim 2, wherein said phase change material has an activation temperature of between 28° F. through 58° F.

9. The hyperthermia headgear liner of claim 3, wherein said phase change material has an activation temperature of between 28° F. through 58° F.

10. The hyperthermia headgear liner of claim 4, wherein said phase change material has an activation temperature of between 28° F. through 58° F.

11. The hyperthermia headgear liner of claim 6, wherein said phase change material has an activation temperature of between 28° F. through 58° F.

12. The hyperthermia headgear liner of claim 7, wherein said phase change material has an activation temperature of between 28° F. through 58° F.

\* \* \* \* \*